M. BURLEW.
RAISIN CURING APPARATUS.
APPLICATION FILED JUNE 7, 1916.
1,233,974.
Patented July 17, 1917.
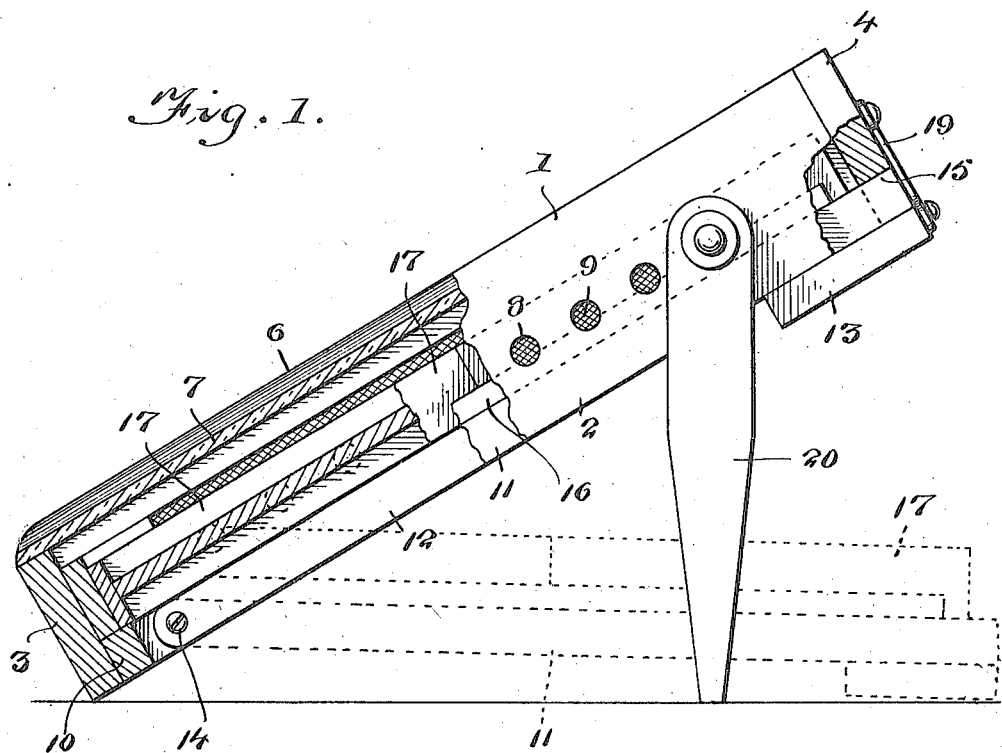
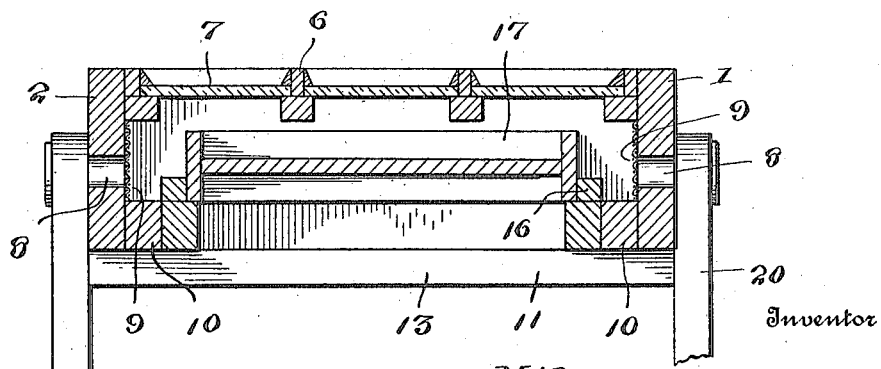

UNITED STATES PATENT OFFICE.

MILES BURLEW, OF SAN QUENTIN, CALIFORNIA, ASSIGNOR OF ONE-FOURTH TO THOMAS WOODS, OF NOGALES, ARIZONA.

RAISIN-CURING APPARATUS.

1,233,974.     Specification of Letters Patent.     Patented July 17, 1917.

Application filed June 7, 1916. Serial No. 102,269.

*To all whom it may concern:*

Be it known that I, MILES BURLEW, a citizen of the United States, residing at San Quentin, in the county of Marin and State of California, have invented new and useful Improvements in Raisin-Curing Apparatus, of which the following is a specification.

This invention is an improved apparatus for use in curing raisins and other products, the object of the invention being to provide an improved apparatus of this kind which is cheap and simple in construction, which exposes the fruit to the full effect of the sun, which cures the fruit rapidly, which protects the fruit from flies and other insects and also from dust and rain while being cured, which provides for the thorough ventilation of the fruit and which may be readily operated.

The invention consists in the features of construction, combination, and arrangement of devices, hereinafter fully described and claimed.

In the accompanying drawings:

Figure 1 is partly an elevation and partly a longitudinal sectional view of a raisin curing apparatus constructed and arranged in accordance with my invention, showing the tray frame in raised position in full lines and in lowered position in dotted lines.

Fig. 2 is a transverse sectional view of the same.

In the embodiment of my invention, I provide a housing 1 which is of oblong rectangular form, comprises side walls 2 and front and rear end walls 3, 4, and is provided on the upper side with mullions 6 and glass panes 7. The lower side of the housing is open. The side members 2 are provided with ventilating openings 8. Screens 9 are secured to the inner sides of the side members 2 and extend across the ventilating openings, and spacer frames 10 are secured to the inner sides of said side members 2. I also provide a tray carrying frame 11 which comprises side members 12 and a rear cross board 13, the ends of which project beyond the outer sides of said side members 12. The front ends of the side members 12 are pivotally mounted as at 14 on the inner sides of the front lower portions of the spacer frames of the housing and hence said tray carrying frame is adapted to be arranged within the housing in the lower side thereof, and is also adapted to be lowered therefrom. The rear transverse member 4 of the housing has notches 15 to receive the rear portions of the bars 12 and said bars are provided on their upper sides with rabbets 16 to receive the sides of the trays 17 on which the grapes or other fruit are placed and spread for curing or drying. A suitable hook 19 is provided to secure the arm 11 in closed position within the lower side of the housing.

The housing is provided with a pair of supporting legs 20 which are pivotally connected to the side members 2 of the housing at points near the rear ends thereof. These supporting legs support the rear end of the housing in elevated position. The front end of the housing bears on the ground and hence the housing is held in an inclined position so that the fruit is exposed to the full effect of the sun.

It will be observed and understood that when the frame 11 is in closed position in the housing, the trays of fruit are held within the housing and protected from flies and other insects and also protected from dust and rain and a great economy is effected by its use in the curing of raisins and other fruit. The curing process proceeds rapidly in my improved apparatus and in as much as it excludes heavy dews and fogs, a superior quality of raisins can be cured by its use.

Having described the invention, what is claimed is:

1. A curing apparatus of the class described comprising a housing open at its lower side, glazed at its upper side, provided with supporting means at one end, and a tray carrying frame pivotally connected to the housing and adapted to be closed therein through the lower open side of the housing.

2. A fruit curing apparatus of the class described comprising a housing open on its lower side, glazed on its upper side, and provided with ventilating openings and also provided with foldable supporting legs near the rear end so that the housing may be supported in an inclined position, and a tray carrying frame adapted to be placed in and removed from the housing through the lower open side thereof.

MILES BURLEW.

Witnesses:
NEWTON A. CRUMLEY,
WILLIAM J. WATSON.

Copies of this patent may be obtained for five cents each, by addressing the "Commissioner of Patents, Washington, D. C."